(12) United States Patent
Kovarik (10) Patent No.: US 10,384,651 B2
(45) Date of Patent: Aug. 20, 2019

(54) SYSTEM AND METHOD FOR REMOVING LIGHT SCATTERING FILM FROM THE INTERIOR OF A WINDSHIELD

(71) Applicant: Joseph E. Kovarik, Englewood, CO (US)

(72) Inventor: Joseph E. Kovarik, Englewood, CO (US)

(*) Notice: Subject to any disclaimer, the term of this patent is extended or adjusted under 35 U.S.C. 154(b) by 547 days.

(21) Appl. No.: 15/016,433

(22) Filed: Feb. 5, 2016

(65) Prior Publication Data

US 2016/0244026 A1 Aug. 25, 2016

Related U.S. Application Data

(60) Provisional application No. 62/160,236, filed on May 12, 2015, provisional application No. 62/118,196, filed on Feb. 19, 2015.

(51) Int. Cl.
*A47L 1/03* (2006.01)
*B60S 1/30* (2006.01)
*B60S 1/04* (2006.01)

(52) U.S. Cl.
CPC .............. *B60S 1/30* (2013.01); *B60S 1/0491* (2013.01)

(58) Field of Classification Search
CPC .......... B60S 1/30; B60S 1/0491; B60S 1/043; B60S 3/008; A47L 1/03; A47L 1/09; A47L 1/12
USPC .... 15/250.28, 250.001, 103, 250.361, 220.2, 15/250.11, 220.1, 210.1
See application file for complete search history.

(56) References Cited

U.S. PATENT DOCUMENTS

| | | | | |
|---|---|---|---|---|
| 3,108,307 A | * | 10/1963 | Redrow | B60S 1/30 15/220.2 |
| 3,731,337 A | | 5/1973 | Doyel | |
| 3,751,750 A | | 8/1973 | Kaftan | |
| 4,977,637 A | * | 12/1990 | Demers | A47L 1/13 15/104.001 |
| 5,105,501 A | * | 4/1992 | Douglas | B60S 1/32 15/250.28 |
| 5,515,570 A | | 5/1996 | Muscroft | |
| 6,446,301 B1 | | 9/2002 | Kemp | |
| 6,481,104 B1 | | 11/2002 | Parker et al. | |
| 7,657,961 B2 | | 2/2010 | Shank et al. | |

(Continued)

FOREIGN PATENT DOCUMENTS

| | | | | |
|---|---|---|---|---|
| CN | 2105136 U | * | 5/1992 | |
| DE | 102006035238 A1 | * | 1/2008 | B60S 1/38 |
| WO | WO2006095229 | | 9/2006 | |

OTHER PUBLICATIONS www.amazon.com, see attached Google history and attached items for sale.*

(Continued)

*Primary Examiner* — Monica S Carter
*Assistant Examiner* — Abbie E Quann
(74) *Attorney, Agent, or Firm* — Sheridan Ross P.C.

(57) ABSTRACT

The present invention discloses a system and method for cleaning the light scattering film (LSF) from the surface of a windshield in a vehicle, and more particularly, is directed to a magnetically associated cleaning element that is moved across the interior surface of a windshield by an interactive magnetic force transmitted through the windshield, with magnets associated with the wiper assembly on the other side of the glass.

4 Claims, 4 Drawing Sheets

(56) References Cited

U.S. PATENT DOCUMENTS

| | | |
|---|---|---|
| 7,946,301 B1 | 5/2011 | Walsh |
| 8,001,649 B2 | 8/2011 | Rhodes et al. |
| 8,057,606 B2 | 11/2011 | Enoch, III et al. |
| 8,256,122 B2 | 9/2012 | Hatfield |
| 8,395,467 B2 | 3/2013 | Fullerton et al. |
| 8,491,312 B2 | 7/2013 | Rudisill et al. |
| 8,505,153 B2 | 8/2013 | Nelson |
| 8,528,149 B2 | 9/2013 | Statkus |
| 8,790,468 B2 | 7/2014 | Simonette |
| 8,826,482 B2 | 9/2014 | Ryu et al. |
| 8,924,019 B2 | 12/2014 | Tang |
| 2006/0032010 A1 | 2/2006 | Francois |
| 2008/0256735 A1 | 10/2008 | Campbell |
| 2012/0264341 A1 | 10/2012 | Mimlitch et al. |
| 2013/0014782 A1 | 1/2013 | Ryu |
| 2014/0332030 A1 | 11/2014 | Trudeau et al. |
| 2015/0027494 A1 | 1/2015 | Ryu et al. |
| 2015/0082572 A1 | 3/2015 | Kim |

OTHER PUBLICATIONS

Ewerlin, Wiper arrangement for windscreen of vehicle e.g. car, has wiper arm that moves over windscreen such that wiper rail has contact with windscreen, where wiper rail has micro-fiber web that directly contacts windscreen, Jan. 31, 2008 ]Translation].*

Wang, Automotive Rare-Earth and Permanent Magnet Motor for Windscreen Wiper, Oct. 12, 1992 [Translation].*

CN 2105136U translation attached.*

* cited by examiner

SYSTEM AND METHOD FOR REMOVING LIGHT SCATTERING FILM FROM THE INTERIOR OF A WINDSHIELD

RELATED APPLICATIONS

This application claims priority from U.S. Provisional Patent Application Ser. No. 62/118,196, filed Feb. 19, 2015 and U.S. Provisional Patent Application Ser. No. 62/160,236, filed on May 12, 2015. The entire disclosure of the prior applications are considered to be part of the disclosure of the accompanying application and are hereby incorporated by reference.

FIELD OF THE INVENTION

A system and method for cleaning light scattering film (LSF) from the surface of a windshield in a vehicle employs a magnetically associated cleaning element that is moved across the interior surface of a windshield by an interactive magnetic force transmitted through the windshield, with magnets associated with the wiper assembly on the other side of the glass.

BACKGROUND OF THE INVENTION

Light Scattering Films (LSF) on automobile interior glass surfaces can be formed from a variety of materials and circumstances. For example, sometimes LSF comprises a combination of dust/condensation with various materials of one's car. Various upholstery or car interior chemicals used to preserve such surfaces can also contribute to LSF formation, and thus using Armorall or cleaning chemicals (especially on the dash) can increase this film. The heat or leak from defroster vents can make LSF worse, and smoking can also increase this film. Typically, LSF is a misty-looking icky film, that is almost unnoticeable, until one is driving directly into the sun, and then LSF can be absolutely blinding.

Chemical analysis of light scattering film formed on interior glass surfaces of vehicles has revealed that much of the LSF was found to be stable organic compounds, emanating from materials in the vehicle interior, and condensing on the glass. Some compounds are produced by chemical reaction on the glass. The qualitative and quantitative nature of such films was found to be extremely variable, with environmental conditions found to contribute to such film's composition. Although vehicle manufacturers have long sought to reduce or eliminate the contributing materials of such films to control the occurrence of LSF, such film formation continues to be a significant problem, and one that threatens the safety of the commuting public. Sun glare or glare from headlights from LSF's has been identified as a contributing factor in numerous accidents where throngs of people have been injured or killed. Attempts to remove such LSF have included various devices, including angled wiping tools so that the particularly sloped surfaces of interior windshields can be more easily reached. Such tools, however, are cumbersome to use and to carry and are not readily transported, let alone used on a frequent basis, leading to the continued problem of LSF on windshields. When drivers of vehicles notice such film build up, such as during a morning or afternoon commute on busy highways, attempts to remove such films while driving the vehicle, e.g. by rubbing a hand or a cloth across the sloped interior surface of the windshield, is dangerous and distracts the driver even further, thus leading to numerous traffic accidents. Thus, there is a long felt but unsolved need for a system and method that effectively cleans the accumulated LSF from the interior of windshields in a simple, economical manner, and via a device that can be reused, readily attached and detached from the vehicle when desired and stored in the vehicle so that the repeated requirement to clean the interior of a windshield can be accomplished on a regular, periodic basis.

SUMMARY OF THE INVENTION

Various embodiments of the present invention are directed to addressing the problem of the accumulation of light scattering film on the windshields of vehicles, whether they are automobiles, aircraft, etc. The number of unfortunate accidents on the world's highways caused at least in part to the inability of drivers to properly view their surroundings has been a long felt but unsolved problem. While there have been various attempts in the past century to address this problem, all such prior devices have suffered from on e or more serious drawbacks, broadly including the awkwardness of the devices employed, and thus the reluctance to use the same, the ineffective removal of the light scattering film in a manner that does not render the situation worse by having streaks made on the interior glass surface of windshields, and the cost of systems that might achieve such a cleaning operation are prohibitive, and therefore not use. Thus, there is a considerable need for an economical system and method for effectively removing light scattering film residue on the interior of windshields, and particularly one where an individual owner of a vehicle can readily employ a device on a periodic basis to effectively remove light scattering film residues without appreciable streaking of the interior glass surface.

One aspect of the present invention relates to the unprecedented lightness in weight of a device that can be easily employed to address the LSF problems set forth herein. For example, in various embodiments, a series of rare earth element permanent magnets are employed, preferably arranged and organized in a linear array or matrix, such that the magnets can be spread across a length of the interior of a windshield's interior, and via contact with a cleaning cloth or other surface, such magnets can be directed across the LSF surface to effectively remove such a film. In certain embodiments, just one pass may be required to effectively remove such a film, but in others, more than two and more preferably, a plurality of passes are employed to adequately remove such film from the interior glass surface of the windshield. In a particular embodiment, a series of strong, permanent magnets are arranged in a generally linear relationship over a span of at least about 8 inches, more preferably at least about 12 inches, and even more preferably over a length substantially equivalent to the length of a wiper blade of such vehicle. The magnets may be maintained in a operably fixed position via various means, including the placement and securement, either temporarily or permanently, within an organizing structure that positions the magnets a set distance away from each other so as to be roughly equally spaced along the length of the, for example, wiper blade that resides on the other side of the windshield. In certain embodiments, the magnets are set in a plastic material that isolates the individual magnets from movement a predetermined distance from each other, with the plastic construct being sufficiently rigid so that the construct does not bend back upon itself, as would occur if the attractive forces of the linearly arrayed magnets were permitted to force the construct to flex, thus causing the magnets in the line to connect to each other. In other words, it is preferred to have magnets constrained in a liner array such that such magnets retain their respective positions from each other to form a desired linear extent so that when the line of magnets is moved across the windshield's interior surface (as described below) they generally maintain the linear relationship of the construct. Preferably the plastic construct is lightweight, durable and washable, e.g. as in a washing machine as further described herein. Exterior material intended to come into contact with the interior of the windshield so as to remove the LSF can be comprised of a variety of different materials deemed effective in cleaning surfaces, and especially glass surfaces. For example, in certain preferred embodiments, microfiber cloth material is associated with the above referenced plastic, magnetically enclosing, linear construct in a manner such that when the construct is moved it brings the associated cleaning material, such as the above referenced micro-cloth, into contact with the interior of the windshield in a manner that removes the LSF from the surface of the glass interior of the windshield. One of skill in the art will appreciate the vast array of different materials that can be employed to associate with the magnetic linear construct to achieve the cleaning operation, but such materials include sponges, cloths, newspaper material, nonwoven material, wipes, blades, etc. In a particularly preferred embodiment, a microfiber cloth is employed having a length that is about the same as the wiper blade assembly, and has a diamond weave that wipes clean without streaking and in a lint-free manner the interior of the windshield's surface, with or without added cleaning agents, chemicals, etc., and is washable and reusable.

Certain embodiments include the use of pre-wetted cleaning materials, such as pre-wetted wipes that are preferably designed to connect to the linear magnetic construct so that such wipes can be employed and later discarded when the cleaning operation is finished. Other embodiments involve the use of a reusable cloth material shaped to fit with and connect with the linear construct as described herein. In such a fashion the cloth material may resemble a linear sock that can receive the magnetic plastic construct so that once the cloth sock is positioned around the magnetic construct, it is ready to use to clean the interior surface of the windshield.

It will be understood that while the described preferred embodiment employs a series of individual magnets spaced apart from each other, other embodiments may use magnetic elements that extend the entire length of the construct, such a longer bar magnet. Moreover, still other embodiments may use a series of magnets that positioned with little if any space between them. In preferred embodiments, however, for cost of construction purposes and in view of the ability to accomplish the desired interior windshield cleaning operation by the use of a minimum number of magnets, the need for and the undesired weights (in many embodiments) that would be occasioned by the use of more magnets would typically suggest that the cleaning contract have a limited number of magnets required to facilitate the adherence of the construct to the interior of the windshield as the construct is moved across the surface of the windshield. Thus, in certain embodiments, as little as two oppositely aligned magnets are used on or near the respective end-portions of a linear construct that has glass contacting elements and is sufficiently rigid along its length so that the remotely spaced magnets of the construct maintain the construct in its desired linear extension as the construct is propelled across the glass surface. In a particular embodiment, a substantially rigid extent of plastic has a strong magnet positioned at each end thereof and is associated with a cleaning cloth or wipe, etc. The end-positioned magnets are attracted to iron-containing material on the opposite side of the glass, such as the metal portions of a wiper blade construct on a vehicle. In more preferred embodiments, magnets are positioned on the exterior wiper blade assembles so that they are effective in attracting an opposing positioned magnet of the linear construct as described herein. The objective is to achieve magnetic attraction between the linear construct and the exterior positioned magnets such that when the wiper blade assembly moves across the exterior extent of the glass, the magnetic forces compel the interiorly positioned linear extension to also move with the wiper blade, but on the other side of the glass. Thus, in various embodiments, a retrofit kit is provided that includes suitable magnet devices that are then interconnected with existing wiper blade assembles. The kit also includes the above referenced magnetic cleaning wand (e.g. the linear construct mentioned herein in association with one or more of the cleaning materials that are brought into contact with the interior of the windshield to remove the LSF residues.

As one of skill in the art will appreciate, the thickness of any given glass windshield may vary, and thus the magnetic attraction involved between the exterior mounted or positioned magnets on a wiper blade assembly and the magnets employed on the interior cleaning wand construct can vary. Preferably, magnets are selected that can appropriately attract each other across a traditional windshield glass thickness of about 4.76 MM to 6.76 MM. Moreover, in certain embodiments, the extent of the LSF build up may vary and thus there may be a desire to attain a stronger magnetic attraction across the windshield thickness so as to achieve a better (e.g. less streaks, less times required to move the cleaning wand across the surface, etc.) cleaning operation.

Magnet strength can be measured in various manners, but a typical way is to refer to the pull force of a magnet, meaning the force required to pull a magnet directly away from a steel surface, and is expressed as a single number. Other ways to refer to the measurement of the magnetic field's strength and direction at a particular point near the magnet is expressed in Gauss or Tesla (1 Tesla=10,000 Gauss). The highest strength in the smallest possible magnet at room temperature, is a grade N52 magnet. A grade N42 magnet is often preferable due to its lower cost while its strength and performance at higher operating temperatures is similar to an N52 magnet, especially if one uses a slightly larger N42 magnet. Preferably, due to the light weight and high strength thereof, Neodymium magnets are preferred, which are composed of neodymium, iron and boron and also referred to as NIB or NdFeB magnets. The grade of neodymium magnets is generally measured in units millions of Gauss Oersted (MGOe). A magnet of grade N42 has a Maximum Energy Product of 42 MGOe. Generally speaking, the higher the grade, the stronger the magnet. The surface field of a magnet is an accurate specification for a magnet and is the magnetic field density at the surface of the magnet as measured by a Gaussmeter. Neodymium magnets are the strongest and most permanent magnets known to man. If they are not overheated or physically damaged, neodymium magnets will lose less than 1% of their strength over 10 years—and they don't their strength if they are held in repelling or attracting positions with other magnets over long periods of time.

In still other embodiments, the desire to have a strong attractive magnetic force employed to achieve the consequent movement of the interiorly positioned cleaning wand and the exteriorly positioned wiper assembly 9 fitted with magnetically attractive elements to attract the cleaning wand through the thickness of the windshield) may make it difficult to facilitate the desired translational movement of the cleaning wand across the interior surface when the wiper blade is moved. While in many embodiments, the use of a soft cloth provides sufficient lack of frictional forces so that desired movement of the wand in concert with the wiper blade movement is achieved, the stronger the magnetic attraction, the more frictional force must be overcome at the cleaning wand-interior windshield surface interface. Thus, in various embodiments, friction reducing elements are employed, which may include rotating elements such as balls, wheels, castors, partially exposed ball-bearings, etc. Such friction reducing features can be employed on either or both of the interior and exterior of the windshield, and thus the linear construct may have at least one, preferably at least two, and more preferably a plurality of friction reducing elements, such as the wheels, ball bearings, etc. so that the movement of the linear construct across the interior surface of the windshield is facilitated while at the same time. The cleaning material associated with the linear construct is brought in to contact with the interior surface of the windshield so as to achieve the cleaning of LSF therefrom. Thus, in some embodiments a retrofit kit is provided that has a clip on or slip on mechanism that operably associated with an existing wiper blade assembly such that both the magnetic attractive aspects described herein are achieved, as well as the facilitating of the smooth movement of the wiper blade across the exterior of the windshield during wiper operations, without unduly hindering such movement due to the increased frictional forces experienced between the wiper blade and the exterior glass surface caused by the magnetic attractive forces experienced when the magnetic cleaning wand is positioned on the interior side of the windshield. A kit of the present invention would preferably include two magnetic cleaning wands, one for each of the typically two wiper blade assemblies found on most vehicles. Certain vehicles, however, employ just one larger wiper assembly, and thus, other kits would include just a single linear construct suitable for use with a single wiper vehicle.

In a particular embodiment, a magnetic cleaning wand includes at least two rolling elements that are positioned at spaced apart positions of a cleaning wand, e.g. one rolling element at or near a first end of a cleaning wand, with another positioned at or near an opposite end, with magnetic elements associated with the wand, also positioned at least near the ends of the wand, and even more preferably with at least another magnetic element at the center of the wand. In certain embodiments, a rolling (e.g. friction reducing feature) is employed substantially adjacent a magnetic element that is positioned on the cleaning wand due to the potential of a magnetic elements that is not supported above the surface of the glass, may thus hinder the desired travel of the cleaning wand across the interior of the windshield when the exterior wiper assembly is operated. In other words, to achieve minimal frictional hindrance of the translational movement of the cleaning wand across the interior surface of the windshield, frictional reducing elements, such as wheels, balls, etc. are employed directly adjacent to the magnetic elements, thus supporting the linear construct at the very places where maximum magnetic attractive forces would otherwise cause the linear construct to bend or flex. In a preferred embodiment, only the exterior or the interior magnetic component has a rolling, friction reducing element associated with it. In a particularly preferred embodiment, the exterior windshield magnetic component associated with the wiper blade assembly has a rolling component associated with it, while the interior windshield magnetic cleaning wand does not, thus enhancing the contact and thus cleaning efficiency of the interior of the windshield due to the frictional force exerted by the opposing magnets separated by the windshield. The rolling features of the wiper blade assembly make it easier for the wiper motor to move the wiper device despite the increased magnetic attractive forces, thus the cleaning of the interior of the windshield is accomplished without undue strain on the wiper blade assembly. In a particular embodiment, at least two roller features, preferably wheels are associated with the magnetic components associated with the wiper blade assembly. Preferably a rigid, elongated sock structure is fitted over the wiper assembly such that one the wiper is in die such a sock structure, the wheels of the structure contact the two end regions of the wiper next to the exterior of the windshield. The operation of the wiper then causes the sock structure to move with the wiper as the two end-wheels of the structure traverse the windshield in an arc pattern, with minimal friction from the wiper due to the absence of the rubber wiper blade touching the window's surface. Conversely, the interior magnetic component preferably does not possess any rolling friction reducing elements, and thus, the preferred cleaning wand contact with the interior of the windshield results in significant pressure being applied due to the strong magnetic attraction between the magnetic cleaning wand and the opposing magnetic elements on the wiper blade assembly. Preferably one merely needs to position a cleaning wand along the junction between a dashboard and the windshield on the opposite side of the wiper assembly in order for the magnetic attractive forces to cause the opposing structures, separated by the windshield, to attract to each other. The operation of the wiper for a preferably short period of time will result in the cleaning wand traversing the interior of the windshield several times, each time cleaning the light scattering film deposits thereon. After such LSF is sufficiently removed, the wiper assembly is stopped and the wiper structural sock can be removed, While in most cases the wiper structural sock does not require any additional fixing element to keep the structural sock in place during a cleaning operation, (e.g. due to the magnetic forces between the sock and the opposed cleaning wand, in some embodiments, a connecting feature, such as a hook and loop tie to the wiper blade assembly is employed to ensure the structural sock does not inadvertently fly off the wiper blade assembly.

Thus, as opposed to the various physical characteristics of the prior art devices, the present embodiments preferably include being of slight weight, e.g. from about one once to less than ½ a pound, more preferably about 10-500 grams, and more preferably no more than about 200 grams. The length of the linear constructs are preferably substantially the same as the length of a wiper blade assembly for the particular vehicle at issue, but in various embodiments the length can be as short as about 6 inches and as long as a few inches longer than the wiper blade assembly—such that even more surface area of the interior of the windshield can be cleaned as compared to the area of the wiper assemblies path across the exterior of the windshield. I still other embodiments, along with the cleaning elements as described herein, the linear construct can include a squeegee-type of feature such that the LSF can also or alternatively solely removed via such a squeegee feature. One of skill in the art will appreciated the various combinations of cleanings materials and number and type of internal window contacting blades that can be associated with a linear construct so achieve desired cleaning operations. Thus, for example, in one embodiment, cleaning wand is provided that can interchangeably include slidable elements that vary from microcloth materials, squeegee blades, sponges, and wipe-retaining clips, thus providing a user the flexibility to address their particular LSF problems as they see fit.

Preferably, the magnetic cleaning wands as described herein would be washable so as to clean the residual debris from the removal of LSF from a windshield. Various embodiments use materials of construction that can withstand the rigors of washing machines so that a vehicle owner can simply wash the cleaning wands and reuse them after being cleaned. As the accumulation of LSF on windshields is an ongoing concern and must be accomplished every few months (preferably) the present invention provides a simple and cost effective way, that avoids the awkwardness of prior art tools to achieve the cleaning the difficult sloped interior surfaces of today's vehicle windshields.

In operation, the method of various embodiments proceeds with a user providing at least one of the linear constructs (e.g. the magnetic cleaning wand) as described herein to the interior of a vehicle, near the interface of the windshield and the dashboard of the vehicle. The wiper blade assembly of the vehicle may already possess sufficient iron containing metals to facilitate the desired magnetic attraction between the cleaning wand and the wiper blade. But to the extent it does not, magnets are portioned on the exterior wiper blade assembly in suitable positions so that they magnetically attract the magnetic elements on the cleaning wand through the windshield glass. Preferably the adaptation of existing wiper blade assemblies in such a fashion is achieved via the sliding-on of a plastic sleeve that has magnets positioned thereon in a proper position so as to align with the cleaning wand magnetic elements on the interior side of the windshield. While one can maintain the cleaning wand in magnetic attractive contact with the wiper assembly even when the wiper is operated for typical removal of rain, road spray, etc., preferably the linear construct(s) are stored under a seat, in the glove box, etc. until they are employed for the particular use in cleaning LSF from the interior surface of the windshield. In other words, while the lightweight and generally sleek preferred design of the cleaning wands used may be unobtrusive to a driver of a vehicle when the exterior wipers are employed, it is believed to be a better practice to reversibly magnetically attach the cleaning wands to the exterior wiper assemblies only periodically to achieve the desired cleaning operation of LSF from the interior window surface.

In yet further embodiments of the present invention, a cleaning wand construct further includes the use of vibrating elements (e.g. Hexbug-type elements) such that additional cleaning movement are achieved in addition to that achieved when merely the wiper blade movement is involved. For example, despite attempts to wipe a glass surface in a manner that will reduce or eliminate the occurrence of streaks, there exists the problem that the same path of a cleaning wand may nevertheless result in uniform streaks being made due to irregularities of the window contaminating surfaces, etc. Thus, in certain embodiments, the provision of vibrating elements along the linear extent of the cleaning wand assist in the cleaning and surface contacting motions that may be required to remove especially stubborn LSF from the interior of a windshield. As one of skill in the art will appreciate, various ways to achieve additional cleaning motions along the linear extent of a cleaning wand can be employed, including reliance upon the translational movement of the wand across the interior windshield surface, where particular rotating ting features can further be provided on the linear construct to facilitate twirling of cleaning elements while the linear construct itself is traveling across the surface of the window. In such a manner, one is able to reduce the prospects that a static point of contact between the cleaning material and the glass surface will be constants, and thus prone to leave streaks when repeated passes of the cleaning material occurs.

In certain applications, a Hexbug type device is employed to achieve movement on the glass surface, thus making it easier to remove the LSF therefrom. The Hexbug is a widely popular and valuable toy that moves by vibrational energy provided by small magnets, such as via Size AG12/LR43, preferably Alkaline with a voltage of 1.5 Volts. In one embodiment that will illustrate the use of vibratory elements in association with a magnetic cleaning wand, and as depicted in the Fig.s, at least three, and more preferably at least about 5 or more hexbug toys are positioned in between the spaced apart magnets that are retained on the linear construct. Such hexbugs are themselves restrained via being glued to the plastic linear construct so that their moving feet features are all positioned in the same direction, preferably perpendicular to the longitudinal axis of the linear construct. The hexbugs are turned on via their individual switches on their bottom portions (e.g. by their moving legs.) A microcloth material is then connected to the linear construct so that the cloth material lies over the feet of the hexbugs. (Alternatively, the hexbugs can be activated through the cloth material or in another suitable manner.) The magnetic cleaning wand is then properly positioned to align with magnetically attractive features on the wiper blade assemblies on the exterior of the vehicle and the wiper is operated to repeatedly drag the cleaning wand across the interior portion of the windshield with the hexbugs' vibrational movement causing the cloth material to contact the interior window surface in a moving brush-like fashion, thus further assisting in the removal of LSF debris. One of skill in the art will appreciate the other vibrational or moveable features that can be associated with the magnetically linear construct so as to achieve enhanced cleaning of LSF from the interior of a windshield.

One aspect of the present invention relates to reminding a driver of a vehicle that it is time to clean the accumulated film that builds up on the interior of a windshield. While such film can be seen when a driver happens to drive into the sun in either a morning or afternoon commute, the dangerous recognition that such film at such time often leads to the driver attempting to remedy the problem by reaching out to rub the interior surface of the windshield, thus taking attention away from the act of driving, resulting in accidents occurring. Thus, one feature of certain embodiments includes the periodic signaling of when interior windshields should be cleaned. Several embodiments of the linear magnetic construct as described herein include an electronic alarm that is activated after a predetermined time has elapsed between window cleanings. In such a manner, a driver will be reminded via such a signal (preferably audible) that the accumulated film on the interior of the windshield should be removed to avoid the above referenced dangers inherent in having such film build-up occur.

Other embodiments include telescoping linear constructs that permit one to vary the length of the construct so fit the area to be cleaned of the interior of a windshield. Thus, in one embodiment, a six inch length of a magnetic construct can be telescopically extended via simply pulling on one end to extend the construct to up to three or more times its compacted size. Other embodiments have jointed structures so that a particular section of such a construct, e.g. a 6 inch section) can be unfolded to create a much longer extension.

Any suitable hinged arrangement between adjacent segments of a magnetic construct as described herein can be employed. The ability of the construct to be reduced in linear size by either folding, telescopically reduced, etc. facilitates the ease by which a driver can store and then later use such device to remove LSF from windshield interior surfaces.

Thus, as further illustrated in the figures and described herein, in various embodiments, magnets are employed that are associated with the existing wiper blade assembly on the outside of a windshield and attracting magnets are positioned on the other side (interior) of the windshield where such magnets are associated with a cleaning member. Preferably, the interior cleaning member has a smooth gliding mechanism associated therewith, such as a soft cloth or rotating wheels, such that the cleaning member can smoothly and without resistance contact and move across the interior surface of the windshield. The exterior wiper may also in certain embodiments have a smooth gliding assembly associated therewith, such that in the event the strong magnetic forces compress the wiper into the glass surface in a manner that causes undue frictional contact with the windshield in a manner that precludes smooth and normal operation of the wiper, the gliding members, including rolling members, such as wheels, prevent such undue frictional contact with the windshield glass, and instead, the wheels permit the wiper to move in its intended arc when operated, and regardless of the increased magnetic forces being applied that compel the wiper and/or the interior positioned magnetic construct to be attracted to the glass surface.

While the emphasis of the present specification has been directed to the removal of LSF, one of skill in the art will appreciate the other related uses of the present invention to achieve similar purposes, such as the reduction or removal of condensation for the interior of a windshield, which similarly poses a hazard to vehicle operators. The condensation is a known physical process for which a substance changes from the gaseous state to the liquid one by means of compression or cooling. If such substance is water, when the vapor existing in the atmosphere or present in a microclimate contacts a cool surface, on this latter a condensation process occurs, which causes the formation of water droplets, called condensate, on the surface itself. Very often it is necessary to remove the condensate which has formed on a surface for being able to properly use the device which bears the surface itself. A vehicle windshield, if covered with condensate, loses its optical characteristics because of the water droplets which multi-directionally refract the light, making almost impossible the driving of the vehicle.

Moreover, as one of skill will appreciate, while the present specification is particularly directed to the reduction of LSF on the interior surface of vehicle windshields, the various embodiments of the present invention find other various applications' in similar fields of endeavor, for example the cleaning of windows of building structures, boats, aircraft, homes offices, signs, office building windows, billboards, the internal surface of the glass of a diving/scuba mask, etc. It will be appreciated that in preferred embodiments a moveable member on the opposite side of a surface (e.g. not necessarily glass—but sufficiently thin so that magnetic attractive forces can be employed to maintain the cleaning wand in a desired position) where the linear construct is moved due to the consequent movement of an element on the other side of the surface to be cleaned. In various other embodiments, a wetting agent may be useful in achieving the removal of LSF from the interior of a windshield. Thus, the out surface of the magnetic linear construct, preferably being a soft cloth material, can be wetted by a cleaning agent, such as Windex™, water, etc. In particular embodiments, a disposable wipe that is specially configured for use with the present invention is connected to the linear magnetic construct such that the dirty film can be removed more efficiently and then the wipe disposed of. As such, certain embodiments of the construct include clamps or other suitable attachment members so that a wipe can be reversibly attached or connected to the construct.

In still other embodiments, a system for use in a vehicle includes not only the ability to clean the windshield, but also the other windows of the vehicle. Thus, in various embodiments, a separate "sister" elongated linear construct sized to be substantially similar to a window's longitudinal extent, is provided, such that lowering the window when the magnetically opposed constructs are in place on opposite sides of a vehicle's window will cause the two constructs to contact the lowermost portion of a window edge, pressing the window between them when the window is opened, thus bringing the window down into the vehicle door. The frictional forces caused by the opposed magnetic structures, especially with the clearing surfaces of associated cloths thereof, removes the interior films that have built up on such interior surfaces. In certain embodiments, only the interior of the window is cleaned in such a fashion, but in other embodiments, both sides of the window are cleaned. Thus, in embodiments where just the interior is cleaned, the exteriorly positioned linear magnetic construct need not have any contact cleaning abilities, but rather merely has magnetic attractive attributes such that it functions to maintain the interior window magnetic linear construct in a magnetically attractive position on the interior of the window during the closing of the window as described herein.

A manually operable magnetic apparatus for wiping windows or some other comparable surface free of moisture and or pollutants and LSF preferably comprises two elongated, linear constructs made of plastic or other composition and fitted with one or more, and preferably a plurality of magnets so that such constructs, when placed opposite each other through a window surface, are held there by their magnetic attraction. The movement of the wiper blade assembly of the vehicle, which is fitted with one of the two constructs, causes the interiorly positioned construct to follow the translational movements of the wiper blade (e.g. in an arced movement across the majority of the windshield surface) and to follows in unison along the window surface, thus wiping the interior surface of the windshield in a manner to reduce, if not eliminate LSF resident thereon.

The elongate, linear magnetic construct is reusable, sturdy, and portable, and does not require soaps or, cleaning fluids, although certain embodiments do include the same. Preferably, embodiments include the use of a wiping cloth, even more preferably a micro-cloth surface, which effectively removes LSF from the interior of a windshield when rubbed across the surface thereof. One will appreciate that such window contacting cleaning materials may also be sprayed or otherwise contacted with water, glass cleaning substances, etc. to further promote the cleaning of the interior of the window surface using the cleaning wands as described herein.

In various embodiments, the magnetic constructs are made from a mold of plastic or other composition, and fitted within these two molds are metal plates and magnets. The metal plates adhered to the magnets act as an armature for greater flux density, hence greater pull power. In certain embodiments, an exterior construct is provided with magnets that are reversibly attachable to the construct by hook and loop fastening material layers. When the wiper blade assembly is fitted with a suitable number of magnets in such an exterior construct is employed, such as a plurality of magnets slid onto existing wiper assemblies via a slide-on plastic channel pre-fitted with such magnets, an interior linear construct of substantially similar length as the exterior construct is placed opposite across the window surface so that the magnetic attraction holds the unit constructs to the window surface. When the wiper assembly with the exterior construct is drawn across the window surface, the interior construct follows in unison, and the interior magnetic construct then wipes the interior of the window clear.

With respect to the above description then, it is to be realized that the optimum dimensional relationships for the parts of the invention, to include variations in size, number of certain elements, method of manufacturing, materials, shape, form, function, and manner of operation, assembly and use, or addition to, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In certain embodiments, a hexbug-type vibrational feature is provided in association with the linear internal magnetic construct of the present invention such that increased cleaning of LSF may be achieved. In other words, in certain situations, the mere movement of a wiper and the consequential movement of a magnetically attracted cleaning wand may not be sufficient to satisfactorily remove all or substantially all of the LSF encountered on a windshield's interior. Removal of such LSF can, however be facilitated and accomplished by oscillation of a device associated with the interior magnetic constrict, such as induced by the motion of a vibration mechanism inside of, or attached to, the construct. The vibration mechanism can include a motor rotating a weight with a center of mass that is offset relative to the rotational axis of the motor. The rotational movement of the weight causes the rotational motor (also referred to herein as a "vibration mechanism"), and the object to which it is attached, to vibrate. The vibration of the object induces oscillations in construct, thus communicating such movement of the cleaning cloth contacting the LSF material on the interior of a windshield. As an example, the vibrational device associated with a construct may include for example, the type of vibration mechanism that exists in many pagers and cell phones that, when in vibrate mode, cause the pager or cell phone to vibrate. Other vibrational devices can be employed, for example those used in vibrating razors and other similar implements, with U.S. Pat. No. 6,481,104 to Parker herein incorporated herein in its entirety for relevant disclosure of such vibration devices.

In other embodiments that include a friction reducing feature, such as a rolling mechanism that permits movement of the construct across the glass to achieve the cleaning operation, a first wheel member (s) may have a surface formed of a material such as fabric or rubber to generate a frictional force against a window when the first wheel members are rotated. Thus, first wheel members may be easily moved along the inner surface of the window without idling and each of the first wheel members may have a surface formed of a material to prevent a scratch from occurring on a window due to the rotation of the first wheel members. When a first cleaning magnetic construct is attached to a surface of a window by a magnetic force of a magnetic construct associated with a wiper blade assembly, the magnetic modules create an attractive force such that the interior construct is carried along the same path of travel as the exterior wiper blade. As the interior construct also has a surface contacting cleaning member associated therewith, such as a micro-cloth or wipe, such movement causes the LSF to be removed.

In particular embodiments, the inside interior windshield construct has no wiper blade associated with the construct, but instead, solely has a soft cloth material that contact this interior windshield glass. In other embodiments, however, at least one blade is employed either alone or in conjunction with a soft cloth to clean the LSF from the interior of the windshield glass surface. In still other embodiments, two squeegees are used, with a soft cloth material in-between such squeegee blades.

The outside wiper blade is preferably strongly attracted to the inside magnetic construct via powerful light weight rare-earth magnets, with the attraction between the two parts being so strong that the interior construct can apply sufficient force towards the glass surface that movement of such construct, whether translationally across the windshield surface, and/or via the vibrational movement provided by the Hexbug-type mechanisms associated with the interior construct, effectively cleans the LSF from the interior of the windshield in an efficient, easy manner that does not require one to employ angled brush or cloth members to manually attempt to clean such surface. The interior cleaning construct, however, is easily detached so that one can store the constructs under a car seat, in a glove box, etc. when not in use.

On aspect of the present invention is to address the magnetic strength of the attractive forces employed so that one achieves the desired translational movement of the construct across the windshield in a manner such that LSF is effectively removed. Too strong an attractive force will not permit the desired movement, while too light a magnetic connecting force will not achieve the cleaning function intended. Thus, various embodiments of the invention address this concern in different manners. One such manner involves the use of additional friction reducing features to permit the use of strong magnets but that do not hinder the desired movement of the construct across the window. Other embodiments, are employed that specifically employ just the right force necessary to achieve this purpose without additional friction redoing features, other than the cleaning contacting materials, and these embodiments are believed to be most available due to the standard construct of most modern day windshields. In still other embodiments, however, one can fine tune the amount of magnetic attraction desired to employ by having an adjustable feature on the construct that lessens the magnetic force or increases it as desired. For example, in certain embodiments, a non-magnetic material is slid into position between the attractive magnetic forces so as to interfere with the attraction, thus permitting easier movement of the construct across a windshield.

One will appreciate that the advent of neodymium magnets has lead to unprecedented designs and structures that would be difficult or impossible if one were to employ more traditional magnetic elements. Thus, in the present inventive embodiments, there is a requirement for a functioning system to clean the interior of a windshield using the powered movement of an outside wiper assembly, that not only must the magnetic attractive forces be significant, but the weight of the magnets involved must be minimal so that the cleaning wand magnetically attached components can function, especially given the rapid movement of today's vehicle wipers. Therefore, it will be appreciated that many teachings of the prior art with respect to the use of magnets on opposite sides of a windshield are remote from the present embodiments as such prior art teaches structures that fail to possess the significantly more robust magnetic attractive forces necessary to employ the prevent invention, and also involve significantly heavier and rigid components that would preclude many of the structural and functional characteristics of the claimed embodiments. The ability of the present embodiments to be compact, with unprecedented magnetic strength and to be designed so that major structural changes to existing wiper assemblies are not involved, makes the present invention distinct from the prior art. The ability to retrofit wiper assemblies, whether temporarily (e.g. via the use of structural encompassing sock-like components that encompass the wiper assemblies), or alternatively more permanently via the inclusion of rare earth magnets on the wiper assembles themselves, e.g. via adhesive glues to permanently affix such magnets to the wiper assemblies, the advent of light weight and yet incredibly strong rare earth magnets has largely made the various presently described embodiments possible and practicable.

Thus, in certain preferred embodiments of the present invention a system is provided for cleaning light scattering film from the interior of a windshield that includes a magnetic component adapted to attach to a wiper assembly of a vehicle, as well as a magnetic linear construct comprising a semi-rigid plate, such plate adapted to receive a plurality of rare earth magnets in a linear array, such construct positionable in a first position for magnetic attraction with the magnetic component. A cleaning element comprised of cloth, paper or non-woven material, is provided that is reversibly connected to the linear construct and has a surface for contacting the interior of a windshield at a portion opposite the wiper assembly positioned on the exterior of the windshield. When the wiper blade is operated, the magnetic forces between said magnetic component and the magnetic linear construct compel the magnetic linear construct to travel across an interior surface of the windshield to remove light scattering film present on the interior surface. Preferably the plate is resiliently flexible and the cleaning element comprises a micro-fiber covering that encompasses a plurality of rare earth magnets that are aligned with an identical number of rare earth magnets associated with the magnetic component such that the linear construct weighs less than about ½ pound and is from about 26-36 inches long. More preferably, the rare earth magnets comprise Neodymium magnets. Other embodiments include a magnetic component associated with the wiper assembly which has a rolling friction reducing element associated therewith and the magnetic linear construct is devoid of a rolling friction reducing element. Certain embodiments employ friction reducing elements that comprise two wheels spaced at the opposite ends of the magnetic component associated with the wiper blade assembly. Other embodiments include flexible structures that resemble an elongated sock or wand. Some have the magnets remaining permanently on the wiper assembly, while others have reversibly attachable magnetic components. Yet other embodiments have magnets arranged on a flexible cloth material that does not include a rigid or semi rigid plastic organizer for the magnets, thus facilitating folding of the cleaning wand and of the opposing wiper sock. Still other embodiments relate to the use of a system that employs attractive rare earth magnetic cleaning wands on opposite sides of the glass of high rise buildings and skyscrapers. In several embodiments, as illustrated in FIG. 12, the cleaning of such windows can be accomplished without the risk of human life due to the employment of scaffolded persons to wash outside windows, Instead, one aspect of the present invention is directed to providing a magnetic cleaving wand sized to extend across the majority of a building's windows (preferably a building having uniformly sized windows), such as by having a pulley system mounted on the top of a building lower an attached cleaning wand to the bottom of a window to be cleaned. On the opposite, interior side of the window, one provides a counterpart magnetic cleaning wand that magnetically attracts the elongated cleaning wand on the exterior of the window, and that is associated with the pulley system. Raising the exterior wand via pulling of the pulley to effect upward movement of the cleaning wand then causes the interior cleaning wand, which is now magnetically attracted to the exterior cleaning wand, to also move upward on the interior of the window. The significant magnetic forces between the opposed cleaning wands then generates sufficient frictional forces to clean both the exterior and the interior of the window surfaces at the same time. When the exterior magnetic cleaning wand reaches the top of the window and passes further up due to progressive pulley movement, the interior magnetic cleaning wand hits the uppermost section of the window and then is pulled away from the exterior cleaning wand by steric obstruction caused by the top of the window frame. At that point the magnetic attractive forces cease to hold the opposed cleaning wands together and the interior cleaning wand falls to the bottom of the window in a harmless manner, e.g. as the interior cleaning wand is relatively lightweight, is flexible and primarily comprised of a linear magnetic rare earth magnet section running through the cleaner wand, and a covering material that comes into contact with the window. Such interior cleaning wand can then be reused for the next window on the next story of the building, or preferably, there are at least three two interior cleaning wands employed in a window cleaning operation such that the arrival of the exterior cleaning wand at the second story (after having the first story's interior wand break contact with the exterior cleaning wand) would then attract the second story cleaning wand, positioned at the bottom of the second story window, and the now detached first story interior cleaning wand could then be provided to the third story window. In such a manner, the cleaning of both the interior and exterior windows of a high-rise building's windows can be achieved with as just three cleaning wands (e.g. one exterior and two interior wands).

As one will appreciate, with respect to the above high-rise window cleaning system and method, the present inventive embodiment provides a moveable cleaning system that enables the cleaning of window surfaces without the use of personnel at the specific site of cleaning. The system can be fully automated, with programming set to enable the system to clean an entire window vertical extent of a surface such as an office building or hotel, and allow system control by someone distal from or proximal to the direct point of application of the cleaning activity. While motorized units can assist with the operation of the pulley unit, it is also possible to clean significantly high building windows by a very inexpensive set up of a pulley and simply three magnetically attractive cleaning wands which does not employ a motor, but rather, just a hand pulley system. U.S. Pat. No.

8,790,468 to Simonette is incorporated herein in its entirety to provide written description and enablement of various embodiments of the present invention. There is no requirement that a person be elevated at the various heights of windows to perform cleaning operations, thus eliminating the risks involved, and the attendant liabilities of the building owners or managers. One of skill in the art will appreciate the numerous ways to provide desired water, soaps, etc. to the exterior and interior cleaning wands, and such additional aspects of having water hoses directed at the window exteriors either prior, after or during the cleaning operation is certainly within the scope of the present invention. Likewise, preloading the exterior or interior cleaning wands with cleaning agents to achieve clean windows is also within the scope of the present invention. In certain embodiments, a "French drain" structure may be employed, which may have rare earth magnets associated therewith or may instead be devoid of such magnets, but otherwise is magnetically attractive due to iron content, e.g. such as a iron pipe, preferably with a multiplicity of holes or apertures therein that permit water to leak out so as to soak the covering material of the iron pipe. Thus, an iron containing bar that has cleaning surface material associated therewith, such as a micro-fiber cloth, can be employed as the exterior elongated bar member that is associated with the pulley to raise and lower such cleaning wand to effect cleaning of the exterior window. A waster source may then be associated with such cleaning wand to deliver desired amounts of water through the interior regions of the elongated pipe component.

One of skill in the art will appreciate that various constructs of an elongated pipe having such water leaking abilities is possible, such as the employment of a PVC pipe with a plurality of apertures, with such PVC pipe being much lighter than an iron pope, and thus, easier to manipulate with a pulley and less dangerous in terms of accidental breakage of windows from undesired contact therewith. One will also appreciate that in various embodiments, the exterior or interior magnetically associated structures can be connected with squeegee blades to further enhance the window cleaning operation. Indeed, in one preferred embodiment, a PVC elongated pipe have a French Drain construction is associated with both a squeegee blade that extends the length of such PVC pipe, as well as associated with a cleaning material, such a s a micro-fiber, sponge, etc. covering that is effective in removing dirt and grime from a window surface. Rare earth magnets are associated with such PVC pipe to render it attractive to an interiorly positioned elongated member inside the building, such that the magnetic attractive forces cause sufficient frictional attractive forces to clean the window as the elongated members are raised upward due to the movement of the pulley form the exterior of the building.

In still other embodiments, a series of suspended exterior pipe structures as described herein can be suspended form one pulley at the top of a building, such that each story, for example, may have a cleaning wand bar directly outside each story's window, and a magnetically attractive elongated cleaning wand (or if cleaning of the interior window is not desired, then simply a magnetically attractive interior bar that is of substantially the same length as the exterior cleaning wand) is positioned at the bottom of the window to be cleaned, thus permitting the magnetic forces between the exterior and interior components to attract to each other such that when the pulley operated to raise the series of exterior cleaning wands, with each then associated with an internal magnetically attractive bar, the windows of the building can be effectively cleaned upon the raising (and in some embodiments also lowering) of the bars, in unison. Repeated up and down motions of such a pulley system may be desired, in which case, care is taken to avoid the unintentional separation of the magnetically attractive bars, e.g. an operator would stop upward movement prior to the interior bar is separated at the top of the window.

In alternative cleaning methods using the above described pulley system of magnetically attractive elongated bars, and with at least one of the exterior or interior cleaning bar having both a cleaning surface (such as a micro-fiber cloth) and a squeegee blade associated with the elongated cleaning wand, it si possible to squeegee in the downward direction after the window surface has been sufficiently cleaned via up and down motions of the pulley driven system. Thus, a final downward squeegee pass on the window in the downward direction would remove residual moisture from the cleaning operation.

An issue that presents itself with magnets moving while attempting to maintain the magnetic attractive forces while being moved, is that the magnetic attraction is sometimes overcome by the frictional forces involved upon which the magnet is moving. Thus, to reduce such frictional interference with the movement of the magnet pair when it traverses a window surface, such as a vehicle windshield's surface, it is preferred that the magnet, at least one of the pair and preferably both of such magnets, are spherical in shape. It has been found that spherical magnets are able to roll over the glass surface, thus avoiding the skipping nature of flat attractive magnets when being moved across and separated by a window surface. Thus, in preferred embodiments, at least two paired magnets of spherical shape are employed. To facilitate the cleaning of the window surface, one pair of spherical magnets is positioned at one end of a window contacting cleaning component, such as a soft cloth material or a squeegee, with the other end fitted with still another pair of magnets, preferably also being spherical, thus permitting the extent of material, squeegee, etc. to be drawn across the window's surface so that internal film thereon can be cleaned.

In still other preferred embodiments, to further reduce the breaking of attractive forces caused by too rapid of a movement of the magnet pairs, certain embodiments employ at least one additional magnet placed in a position that is ahead of the direction of movement of the magnet. Thus, in various embodiments there is a magnet placed within one half inch of the paired magnet such that when the paired magnet pair is moved across a window surface, the attractive forces of the preceding magnet set up a magnetic field that provides a magnetic path for the paired magnet pair to follow that reduces or eliminates the occurrence of skipping caused by frictional forces caused by the surface interaction between the magnet pair and their respective surfaces. In certain embodiments, there is one or more of a smaller magnet positioned on either side of a magnet having a larger magnetic force (e.g. one of the magnet pair) such that when a wiper blade assembly is moved to-and-fro, the wiper-mate magnet assembly moves easier across the surface of the glass when the periodic wiper blade passes back and forth over the window surface, without suffering from skipping that may otherwise occur between the magnet pair. Preferably, the wiper is operated on its slowest speed available so as to reduce the likelihood that the magnetic pair contact will be broken due, for example, to the too quick movement of the pair, thus permitting frictional forces to break the magnetic attraction between the two magnets that form the pair. The additional smaller magnets, properly placed in relation to the larger (or more attractive) magnets, is preferred to also preclude the breaking of the desired magnetic force attraction (such as by skipping of a magnet) and to attempt to re-attach to the previously experienced mating forces. While the cross-glass movement is achieved, such skipping may result in breaking the magnetic attraction between the magnetic pair, thus defeating the objective of the invention: the paired moving retention of the interior magnetic cleaning element such that the interior of the windshield has its light scattering film removed via the back and forth motion of the blade assembly as it is magnetically coupled to the magnetic "wiper-mate" on the interior of the windshield.

Preferably, the spherical magnets are coated with a thin coat of soft material that avoids scratching of a window glass surface as the ball-shaped magnets rolls along the surface of the glass. Protective covers reduces the likelihood the magnets will scratch or otherwise damage the glass surface, with protective covers being any soft material, such as felt. However, any soft, non-scratching material attachable to magnet is suitable for use as protective cover. In other embodiments, however, the rolling nature of the magnet avoids the prospect that any debris on the glass will cause a scratch in the window by the rolling movement of the magnet. Neodymium Iron Boron (NdFeB) magnets have the highest energy density of commercially available magnets. In a tested prototype, when embedded in a commercial SUPPERBALL, a pair of balls could be dropped from about a meter and have a high probability of sticking together as they bounced. Samarium Cobalt (SmCo) magnets, although weaker, may be used. In some application, Aluminum Nickel Cobalt (AlNiCO) magnets may be used when a weak magnetic field is sufficient.

Imbedding of magnets into elastopolymers (herein referred to by the generic term of "rubber") results in the novel combination of the "mysterious" attractive-repulsive action of magnets to the elastic action of rubber. Although a variety of magnet types, shapes, and sizes are compatible with the system of the present invention, preferably, magnet is a disc-shaped neodymium magnet (neomagnet) having a diameter of about 2 inches (5.08 cm), a thickness of about 0.5 inches (1.27 cm), and a grade or rating of about 30 to 45 T (30,000 to 45,000 gauss; available from AEC Magnetics, Cincinnati, Ohio, product no. H-4162). Although a grade of about 30 to 45 T is preferred, magnets in the range of about 10 to 90 T (10,000 to 90,000 gauss) are also compatible with this invention.

While a single magnet produces sufficient pull additional magnets may be stacked on top of one another to provide increased pull for other applications.

One of skill in the art will appreciate the various ways to manufacture acceptable constructs to achieve surface cleaning functions, especially directed to cleaning windows, and even more specifically to cleaning windshields. In various embodiments, the spherical magnets are retained in a manner that permits the maximum attractive forces between a magnet pair that is separated by a glass surface such as by having retention enclosures that permit direct contact of a portion of the sphere with the glass surface, preferably both of the magnets that make up the pair of magnets is retained in a rolling permissive fashion such that at least a portion of the magnet is in direct contact with the glass. With respect to a windshield, therefore, it is advisable to have a pair of magnet construct such that at least a good portion of the spherical magnet, preferably just less than the entire region around the equator of the sphere, is uncovered by the retaining mechanism or structure, thus facilitating the rolling capability of the magnet, while at the same time, permitting the direct glass surface contact by the magnet. By doing similar retention structures on each side of the glass, the best prospects are achieved to retain desired magnetic attraction of the pair of magnets. Similarly, smaller spherical magnets can be retained in the same fashion, but positioned in such a fashion next to the main magnetic pair to facilitate the absence of skipping of the magnet pair. While not bound by theory, it is believed that the magnetic field created by both the main magnet and an adjacent smaller magnet, provides a broader area over which magnetic attractive forces can be generated to facilitate the desired movement of the magnetic cleaning aspects of the various embodiments of the present invention. One of skill in the art will further appreciate that more than one or two magnets, whether spherical or not, can be provided in positions away from the main magnetic pair, to achieve the above described facilitated movement of the magnets that are separated by a glass surface and where a cleaning element associated with such magnets, is compelled to move when the opposing magnet of the pair is moved across the opposing side of the glass. Additional figures show spherical magnet structures that are encompassed by the present invention.

The aforementioned Summary of the present invention should not be construed as limitations on the scope of the invention, but rather as an exemplification of one preferred embodiment thereof. Many other variations of use are possible, as will be known by one of skill in the art in view of the disclosure and guidance as provided herein.

BRIEF DESCRIPTION OF THE FIGURES

Further features and advantages of the present invention will result more evident from the indicative, and therefore non limiting, description of a preferred, but not exclusive, embodiment of a device for removing condensate from surfaces of a body, as shown in the enclosed drawings, wherein.

WRITTEN DESCRIPTION OF CERTAIN
PREFERRED EMBODIMENTS

Advantageously, the magnetic attraction between the first and the second magnetic positioned on opposite sides of a windshield 12 facilitate the moving of the exterior magnet 18 in a fashion so as to cause the interior magnet 18 to move, thus cleaning LSF from the interior of a windshield. A first magnet 18 generates a magnetic induction flow which passes through the glass surface and reaches the second interiorly positioned magnet 18, which interacts with the first magnet 18 and ensures that the two magnets are mutually attracted each other. The exteriorly positioned magnet 18 is preferably associated with a wiper blade assembly of a vehicle. Alternatively, the wiper assembly, instead of employing a magnet 18, can simply include a ferromagnetic element instead of a magnet, such that the ferromagnetic element is reached by the magnetic induction flow of the first magnet 18 positioned on the interior side of a windshield 12 and being magnetically attracted by this latter. The magnets employed are preferably rare earth magnets due to their small size and great strength and the ability to last for long periods of time without losing their magnetic attractive features. Alternative embodiments, however, include the use of some or all of natural magnets, such as those constituted of naturally magnetized magnetite, as well as artificial magnets, such as magnets wherein the magnetic properties have been obtained by subjecting the material used for obtaining the magnet to a magnetization treatment.

In still other embodiments, the magnets of the wiper blade assembly may be one or more electromagnets that may be fed by an electric source and activated by an operator or driver. In each case, independently of the type of magnet 18 used, the first exterior magnet 18 and the second interior magnet 18 should be selected in such a way that the attraction force between the magnets is at least sufficient to ensure that the two magnets remain in contact with the respective face of the surface (e.g. windshield).

In certain embodiments, the magnets employed, either in the exterior wiper assembly or in the internal magnetic construct, are removable and replaceable, such that one can adjustably select the type, strength and number of magnets employed in any particular situation. Thus, thicker windshields can be cleaned simply by selecting stronger magnets for use in the opposed constructs. Thus, if one desires to change the thickness of the surface from which it is necessary to remove a LSF or condensate, it is possible to change the magnets to restore the correct or desired magnetic attraction force between the two opposing constructs.

In a particular embodiment of the present invention relating to scuba or snorkel masks, a divers glove can be accommodated to have at least one magnetic element associated therewith such that an internally positioned wiping element can be magnetically directed to wipe the internal surface of the scuba mask when the magnetic element of the diver's glove is moved in such a manner. Thus, while in some embodiments a scuba mask would feature an integral internal wiping mechanism having at least one magnetic element associated therewith, in other embodiments, a linear magnetic construct is provided that can be used with existing masks by simply placing such a construct inside the mask prior to use by a diver. Then with the mere attraction of the magnetic linear construct inside the mask by a diver's glove (which has at least one magnetic element therein—such as in the small finger outer extent of such a glove)—it is possible for the diver, while under water, to simply position his little finger next to the glass surface of his/her mask and thereby attract the linear magnetic construct so as to cause such linear construct to traverse across the interior surface of the mask, thus clearing condensate from such surface. In other embodiment, the exterior magnetic component may not be in a diver's glove, but instead may be either a freely hand-held magnet, such as attachable around a diver's wrist (so they do not inadvertently drop the same) such that when a diver's mask gets foggy, they can simply raise the magnet 18 to the surface of their mask and cause the internally located magnetic cleaning element to be moved across the interior mask's surface, thus removing the condensate there from. In still other embodiments, masks are manufactured such that an internal magnetic element is permanently part of the internal structure of the mask, with an opposing magnetic element part of the external portion of the mask. Movement of the external portion then causes the internal portion to move, thus facilitating the cleaning of condensation on the inside of a diver's mask without the need to traditionally "clear" the mask via permitting water inside to run across the surface of the interior mask glass.

After a certain operating time, the body heat warms the internal face of the transparent surface of the mask and, as typically the diving environment has a temperature lower than 37° C., the internal face of the transparent surface begins to be affected from the condensate formation. By slidably dragging the external magnet 18, the internally positioned linear magnetic construct of the mask is similarly moved across the internal surface of the mask's glass, due to the magnetic attraction, and cleans off the accumulated condensate. In such a scuba mask application the internal cleaning material may be either a rubber or plastic blade, or another type of cloth material that does not leave undesired streaks across the glass, while effectively removing the condensate formed on the interior surface of the mask. While in certain embodiments, the internal magnetic construct is in a fixed relation to the mask, in others the construct is simply placed freely into the mask by a diver, such that the diver can manipulate the magnetic construct when required and in a manner that the diver sees fit, e.g. the diver may wish to clear a portion of the side of his/her mask, rather than a front portion, employing the same magnetic linear construct that may be also used to clear the front mask structure.

Similar to the embodiment directed to the scuba mask, one of skill in the art will appreciate various other applications of the present invention in the skiing and snowboarding field as winter goggles often suffer from condensate buildup and require cleaning. In accordance with the description set forth herein with respect to a scuba mask one of skill will appreciate that a goggle can replace a mask and thus the description of such a separate embodiment is also met by the above description.

For ease of complying with written description and enablement requirements, the following references are incorporated herein in their entireties: 20120042464 to Statkus; U.S. Pat. No. 6,446,301 to Kemp; U.S. Pat. No. 515,570 to Muscroft; U.S. Pat. No. 8,528,149 to Satkus; 20130014782 to Rya; WO2006095229 to Fabiani; U.S. Pat. No. 8,924,019 to Tang; U.S. Pat. No. 8,001,649 to Rhodes;

U.S. Pat. No. 7,946,301 to Walsh; U.S. Pat. No. 8,528,149 to Statkus; U.S. Pat. No. 8,395,467 to Fullerton; 20120264341 to Mimlitch; U.S. Pat. No. 8,057,606 to Enoch III; U.S. Pat. No. 7,657,961 to Shank; 20060032010 to Francois; U.S. Pat. No. 5,105,501 to Okeefe; U.S. Pat. No. 4,977,637 to Demers; U.S. Pat. No. 3,731,337 to Doyel; U.S. Pat. No. 3,751,750 to Kaftan; 20080256735 to Campbell; U.S. Pat. No. 8,256,122 to Hatfield; U.S. Pat. No. 6,446,301 to Kemp; U.S. Pat. No. 8,505,153 to Nelson; U.S. Pat. No. 8,826,482 to Chin; 2015/0027494 and 2014/0332030 to Trudeau; 2014/0034084 to Ryu et. al.; 2015/0082572 to Kim; U.S. Pat. No. 8,491,312 to Rudisill; all generally related to the field of providing increased visibility through a windshield 12 to promote driving safety, and/or directed to various magnetic assemblies that have application in particular embodiments as set forth herein.

One of skill in the art will appreciate the various modifications and embodiments that are encompassed by the present invention as described herein, especially in view of the guidance provided by the figures in the present application.

Figure 1:
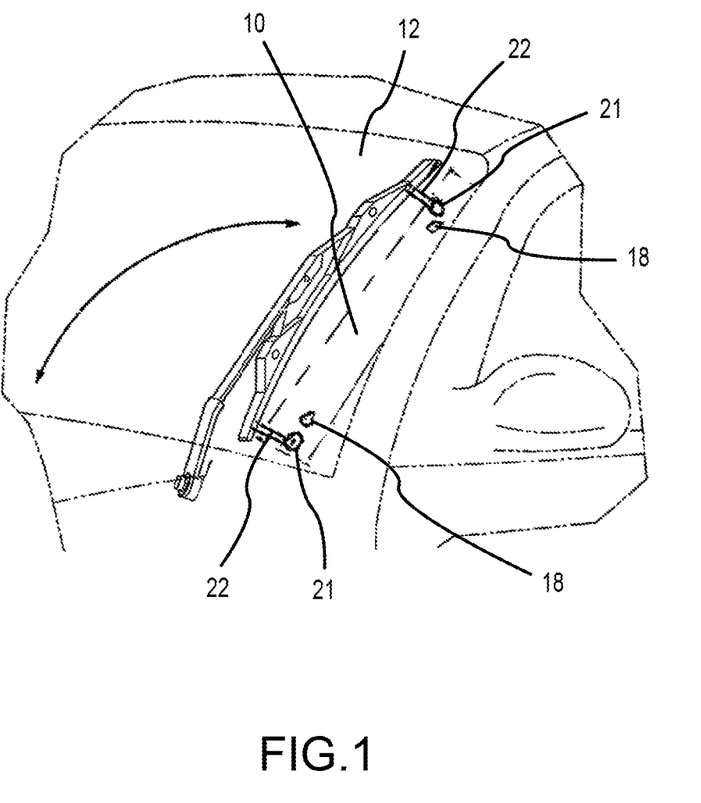
FIG. 1 shows an embodiment where magnetic elements are provided on wiper extensions such that the spherical magnets can attract a magnet on the interior of the windshield that is associated with one or more cleaning elements. In various embodiments, the spherical magnets are retained in a manner that permits the maximum attractive forces between a magnet pair that is separated by a glass surface such as by having retention enclosures that permit direct contact of a portion of the sphere with the glass surface, preferably both of the magnets that make up the pair of magnets is retained in a rolling permissive fashion such that at least a portion of the magnet is in direct contact with the glass. With respect to a windshield, therefore, it is advisable to have a pair of magnet construct such that at least a good portion of the spherical magnet, preferably just less than the entire region around the equator of the sphere, is uncovered by the retaining mechanism or structure, thus facilitating the rolling capability of the magnet, while at the same time, permitting the direct glass surface contact by the magnet. By doing similar retention structures on each side of the glass, the best prospects are achieved to retain desired magnetic attraction of the pair of magnets

FIG. 1 shows an embodiment where magnetic elements 21 are provided on wiper extensions 22 such that the spherical magnets 21 can attract a magnet 18 on the interior of the windshield 12 that is associated with one or more cleaning elements associated with the linear magnetic component 10.

Figure 2:
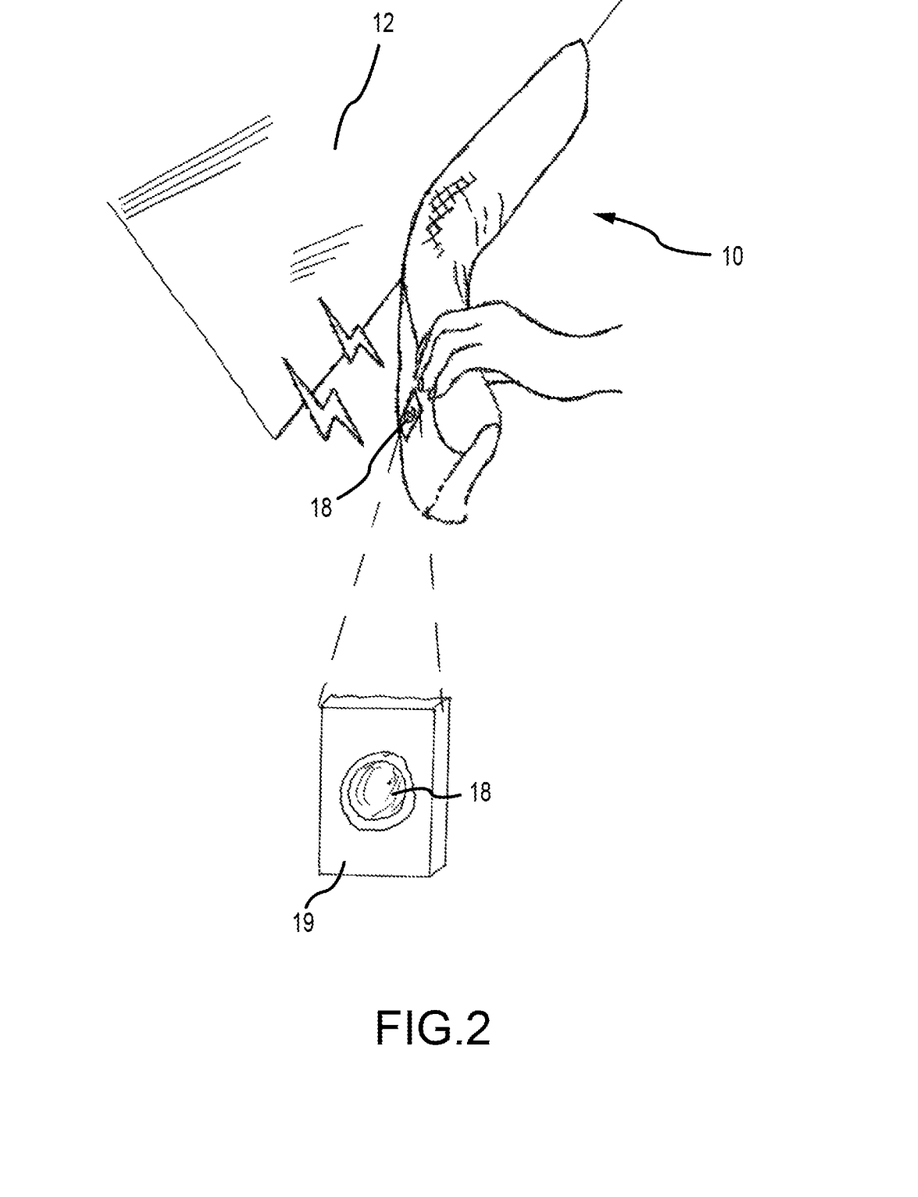
FIG. 2 shows an exploded view of a particular plastic washer that retains a spherical magnet so that it is in window surface rolling contact with a window surface, and is attracted to another magnetic feature (not shown) on the opposite side of the window.

FIG. 2 shows an exploded view of a particular plastic washer 19 that retains a spherical magnet 18 so that it is in rolling contact with a windshield 12 window surface, and is attracted to another magnetic feature (not shown) on the opposite side of the windshield 12 window.

Figure 3:
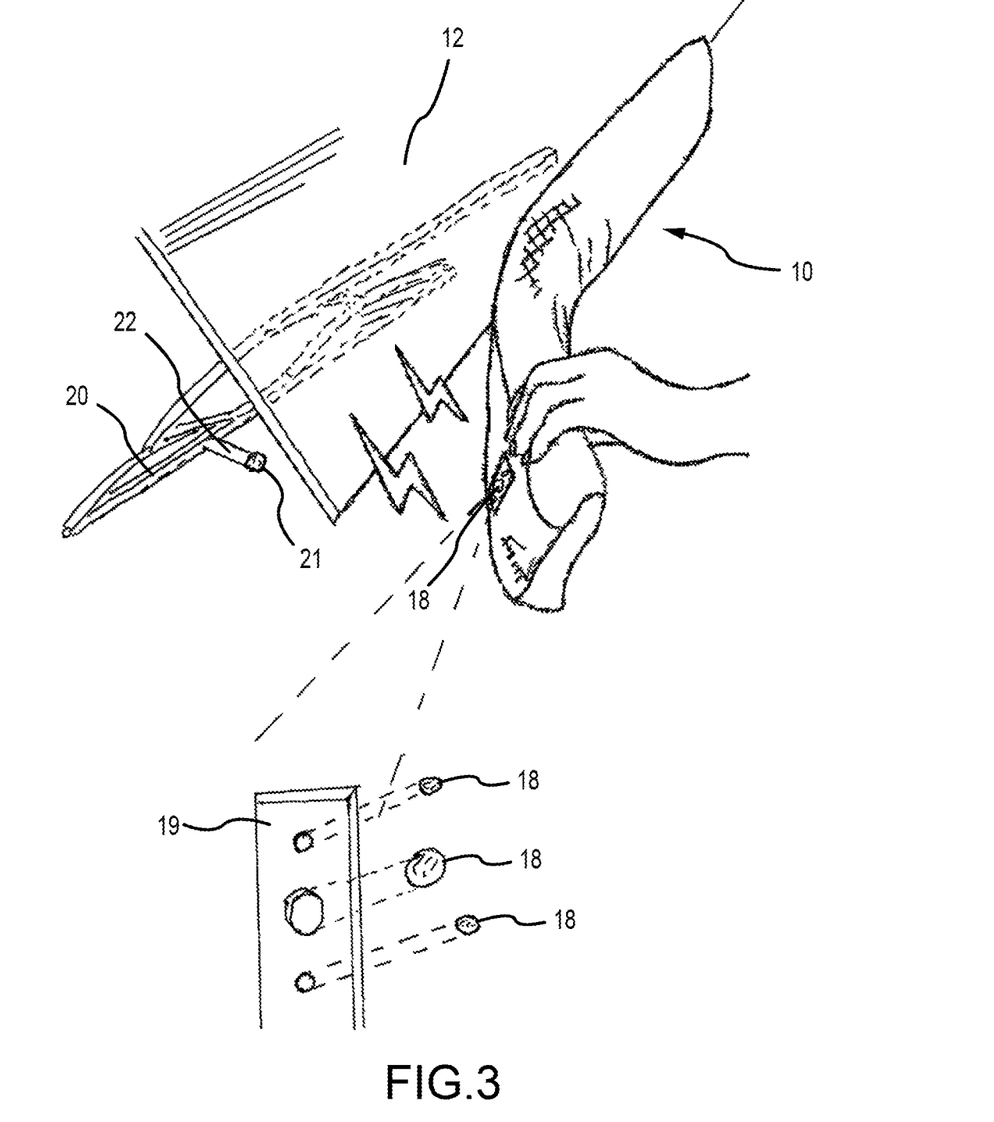
FIG. 3 shows a "Wiper-Mate" device assembly where an exterior magnetic component is associated with a window wiper of a vehicle, and an interior component having a magnetic attractive feature comprising a plurality of magnets fixedly connected to a soft, window wiping material is on the interior of the window.

FIG. 3 shows a "Wiper-Mate" device assembly where an exterior magnetic component is associated with a window wiper 20 of a vehicle, and an interior component having a magnetic 18 attractive feature comprising a plurality of magnets 18 fixedly connected to a soft, window wiping material is on the interior of the window, generally referred to herein as a linear magnetic component 10 One will appreciate that various brackets 22 can be employed to either fixedly or reversibly attach magnets 21, preferably at least one spherical magnet 21, to the exterior side of a windshield 12 of a vehicle (preferably via association with the movable wiper blade 20 assembly) so as to magnetically attract one or more magnets 18, preferably at least one of which is spherical, on the inside of the vehicle windshield 12.

Figure 4:
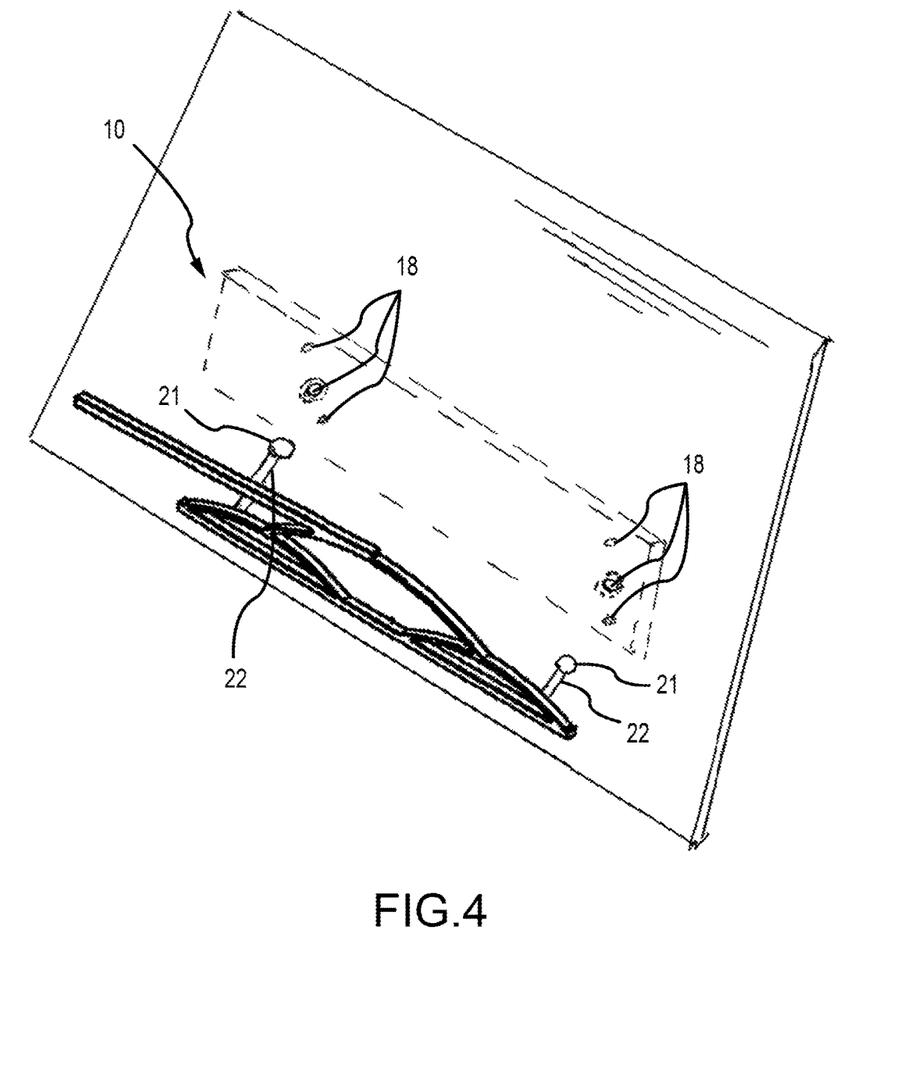
FIG. 4 shows an embodiment where a series of magnets, preferably spherical, are positioned on either side of a windshield to facilitate reversibly attachable magnetic material traversing the interior window surface.

FIG. 4 shows an embodiment where a series of magnets 21, preferably spherical, are positioned on the exterior of a windshield 12 to facilitate reversibly attachable magnetic material traversing the interior windshield surface. One will appreciate that one or more smaller magnets 18 may be used in conjunction with larger magnets 18 so as to facilitate directional movement of a linear magnetic component 10 when an exterior magnetic component 18 is employed to magnetically attract the interior linear magnetic component 10 designed to contact the interior windshield 12 window surface to facilitate cleaning thereof.

As designed, a device and method embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A system for cleaning light scattering film from the interior of a windshield, comprising:
    a linear magnetic component comprising:
    a first plurality of rare earth magnetic members, and
    a material for cleaning a windshield's interior surface;
    a second plurality of rare earth magnetic members adapted to be connected to a wiper assembly of a vehicle located on an exterior of said windshield,
    said first plurality of rare earth magnetic members adapter to be positioned on the interior side of said windshield and opposite said second plurality of rare earth magnetic members, such that when said second plurality of rare earth magnetic members are moved, said linear magnetic component moves simultaneously therewith, with magnetic forces alone between said linear magnetic component and said second plurality of rare earth magnetic members on the exterior of the windshield compelling the linear magnetic component to travel across the interior of the windshield;
    wherein said linear magnetic component is portable and is adapted to be stored in the vehicles glove box or under a seat of the vehicle and wherein the first plurality of rare earth magnet members comprise at least two spherical rare earth magnets at a first end and a second end of said linear magnetic component, said linear magnetic component positionable in a first position on the interior surface of the windshield for magnetic attraction with said second plurality of rare earth magnetic members on the exterior of the windshield, said at least two spherical rare earth magnets having a thin coat of soft material to avoid scratching the windshield's interior surface as the at least two spherical rare earth magnets roll along the interior surface of the windshield.

2. The system as set forth in claim 1, wherein said second plurality of rare earth magnetic members comprise a spherical magnet member adapted to connect to the wiper assembly of the vehicle with an extension positioning the spherical magnet member above the wiper assembly.

3. The system according to claim 1, wherein said second plurality of rare earth magnetic members are spaced apart.

4. A system for cleaning light scattering film from an interior of a windshield, comprising:
    an exterior magnetic component adapted to attach to a wiper assembly of a vehicle,
    a linear magnetic component adapted to receive a plurality of Neodymium magnets in a linear array, said linear magnetic component positionable in a first position for magnetic attraction with said exterior magnetic component, said linear magnetic component comprising a material for cleaning the windshield's interior surface;
    said linear magnetic component having a surface for contacting the interior of the windshield at a portion opposite the wiper assembly positioned on an exterior of the windshield, whereby when the wiper assembly is operated, magnetic forces between said magnetic component and said linear magnetic component alone compel the linear magnetic component to travel across the interior surface of the windshield to remove said light scattering film present on said interior surface, wherein the linear magnetic component, weighs less than ½ pound; and wherein the plurality of Neodymium magnets comprise at least two spherical rare earth magnets at a first end and a second end of said linear magnetic component, said at least two spherical rare earth magnets having a thin coat of soft material to avoid scratching the windshield's interior surface as the at least two spherical rare earth magnets roll along the interior surface of the windshield.

* * * * *